Patented Oct. 1, 1929

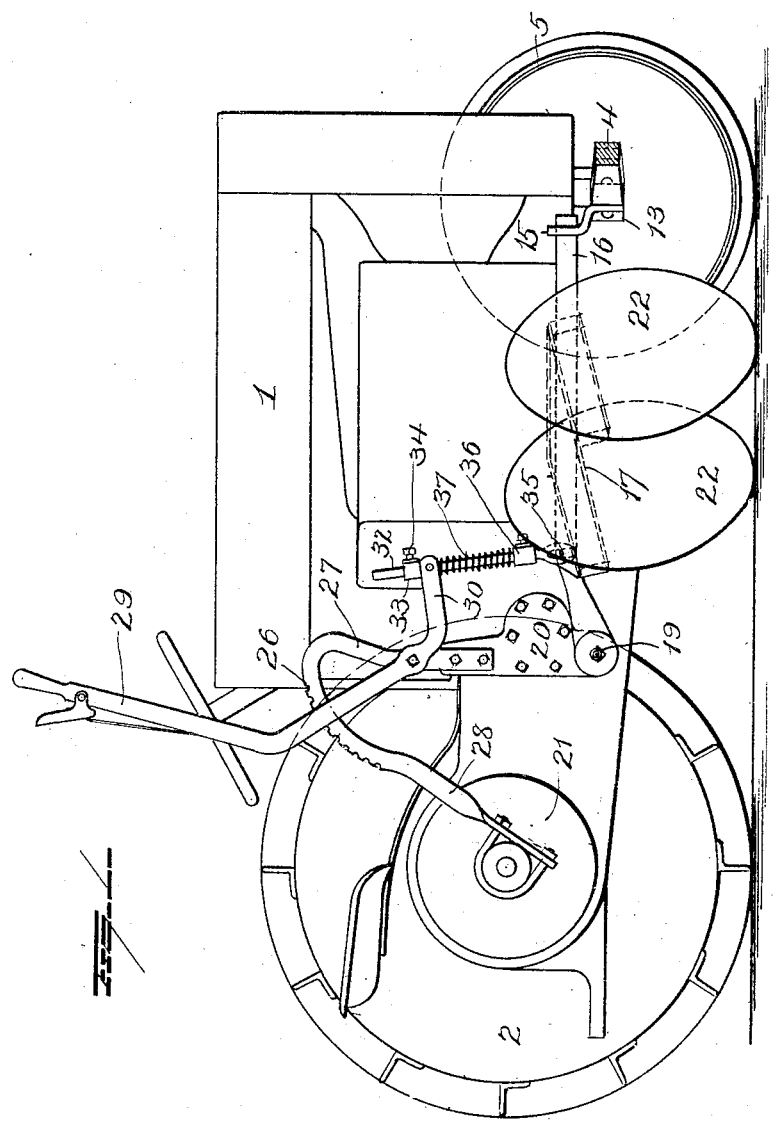

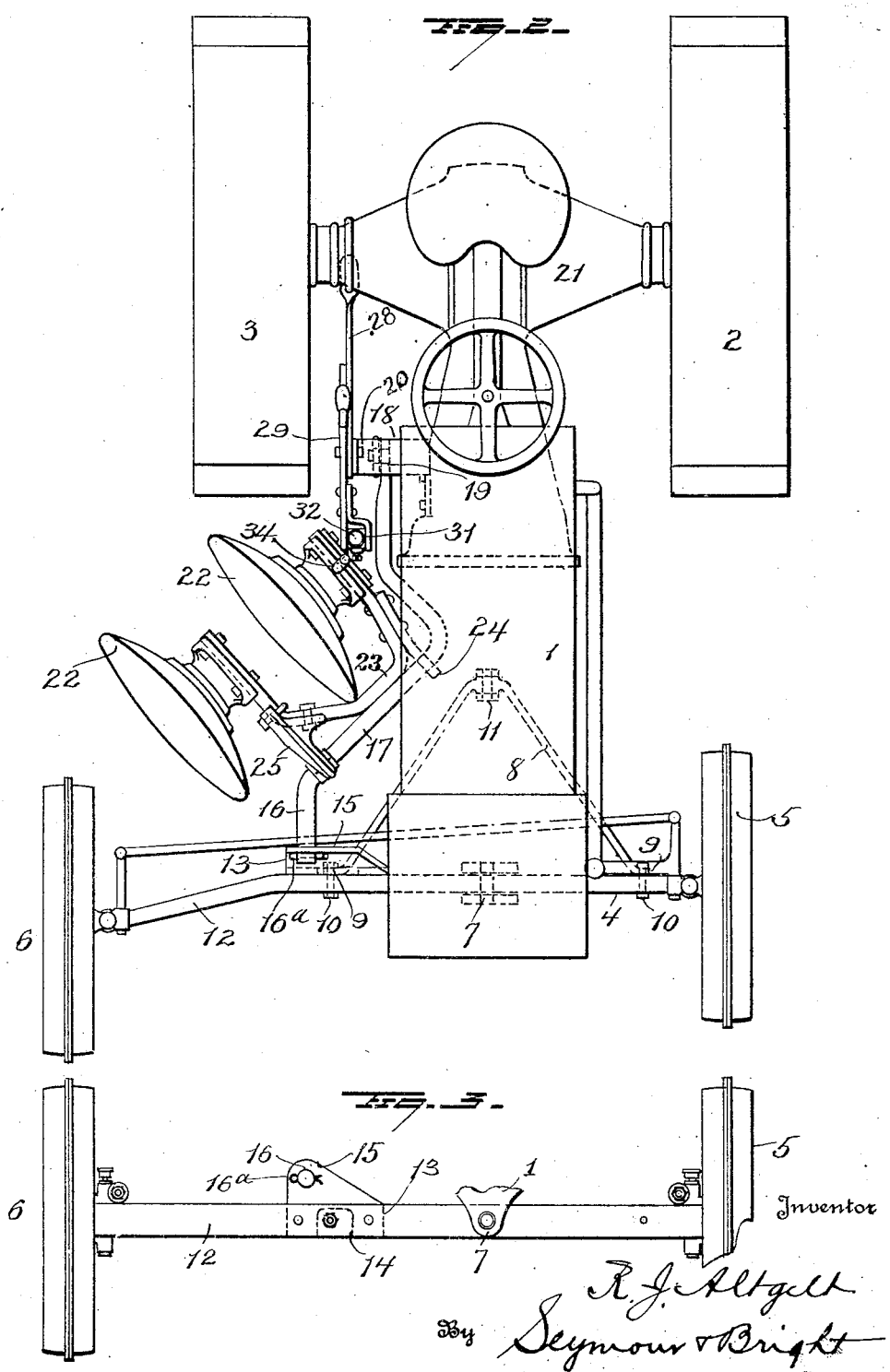

1,729,639

UNITED STATES PATENT OFFICE

RUDOLPH J. ALTGELT, OF SOUTH BEND, INDIANA, ASSIGNOR, BY MESNE ASSIGNMENTS, TO OLIVER FARM EQUIPMENT COMPANY, A CORPORATION OF DELAWARE

TRACTOR PLOW

Application filed July 23, 1925. Serial No. 45,554.

This invention relates to improvements in tractor plows and more particularly to that type in which the soil engaging elements are located at one side of the body of the tractor as distinguished from those which trail behind the tractor.

One object of the invention is to provide a simple and efficient tractor plow structure in which the soil engaging elements are located at one side of the body of the tractor and intermediate the front and rear wheels of the tractor.

A further object is to provide improved means for connecting the soil-engaging elements with the tractor at one side thereof.

A further object is to so connect the soil engaging elements to the tractor that they shall be capable of vertical play and yet kept properly at work, and so that they shall be capable of being raised and lowered, and to provide simple means for raising and lowering the soil-engaging elements.

With these and other objects in view, the invention consists in certain novel features of construction and combinations of parts as hereinafter set forth and pointed out in the claims.

In the accompanying drawings;

Figure 1 is a view in side elevation showing a tractor plow structure embodying the improvements;

Figure 2 is a plan view, and

Figure 3 is a partial end view.

In the drawings, the body of a tractor is represented at 1; the rear traction wheels at 2 and 3; the front axle at 4 and the front steering wheels at 5 and 6. The front axle is pivotally connected with the forward portion of the tractor body in such manner that said axle may have a limited vertical movement on an intermediate horizontal pivot 7. The front axle is also connected with the body of the tractor through the medium of a V-shaped brace 8, the feet 9 at the forward ends of the arms of which are rigidly bolted to the front axle as at 10, while the apex of the V-shaped brace is connected with the tractor body by a horizontal pivot 11 which is in line with the pivot 7 as shown in Fig. 1.

The front steering wheel 5 of the tractor is in line with the rear traction wheel 2, but the opposite end portion of the axle 4 is bent somewhat forwardly as at 12 and is made of such length that the front steering wheel 6 will be disposed laterally of the line of travel of the rear traction wheel 3.

The front axle 4 is made in a single piece and has secured to its rear side near the portion 12 and a considerable distance from the steering wheel 6, a bracket 13 which is cut away at 14 for the accommodation of one of the feet 9 of the V-shaped brace 8. The bracket 13 projects rearwardly from the axle 4 and is made with an upright member 15 (in rear of the axle) having a hole to provide a loose mounting for the forward end of a shaft 16,—displacement of which is prevented by a key 16ª. The shaft (which is circular in cross section) is so bent that its forward and rear portions are disposed in parallel vertical planes longitudinally of the tractor while its intermediate portion 17 is diagonal to the tractor body and to the axles of the tractor. The rear end portion of the shaft 16 may be flattened as at 18 and is loosely connected by a pivot bolt 19 with the lower portion of a bracket 20 securely bolted to the side of the tractor body 1 and in advance of the housing 21 of the rear axle and transmission mechanism. It will be observed that while the major portion of the shaft 16 may be circular in cross section, it cannot rotate.

The beam for earth working disks 22, 22, is made in the form of an approximate U-shaped bail 23, to the arms of which said earth working disks are connected. This beam-bail is connected with the diagonal portion 17 of the shaft 16 by means of arms 24—25 which are rigidly secured to said beam-bail and loosely mounted on said shaft,—the earth working disks being thus disposed, one inwardly and in rear of the other and intermediate of the rear traction wheel 3 and the forward steering wheel 6 at the same side of the tractor body.

A toothed segment frame 26 is located near the rear portion of the tractor body and its arm 27 is secured to the bracket 20 while its arm 28 is secured to the rear axle housing 21. A hand lever 29 is pivoted to the arm 27 of the segment frame and provided with a suitable detent to cooperate with the toothed portion of the segment frame. The short arm 30 of the hand lever carries a pivoted collar or sleeve 31 through which a rod 32 passes and to this rod, a collar 33 is secured over the lever arm by means of a set screw 34. The lower end portion of the rod 32 is connected with one of the arms of the beam-bail 23 as indicated at 35. A collar 36 is adjustably secured to the lower portion of the rod 32 and between this collar and the lever arm 30, a spring 37 is located on the rod 32,—said spring serving normally to press the disks properly to their work, but permitting them to yield vertically when an obstruction is encountered. It is apparent that the tension of the spring may be readily adjusted by adjusting the collar 36 on the rod 32.

By means of the hand lever 29, the beam-yoke and hence the earth-working disks may be raised or lowered and the depth of penetration of said disks may also be regulated by manipulation of said lever.

Various changes might be made in the details of construction of my invention without departing from the spirit thereof or limiting its scope and hence I do not restrict myself to the precise details herein set forth.

Having fully described my invention what I claim as new and desire to secure by Letters-Patent, is:—

1. In an agricultural implement, the combination with a tractor body and a front axle, of a non-rotatable shaft located at one side of the tractor body and supported by the body at one side thereof and by the front axle, said shaft having a diagonal intermediate portion and having end portions substantially parallel with the longitudinal axis of the tractor body, a beam loosely mounted on the diagonal intermediate portion of said shaft, and earth-working means carried by said beam.

2. In an agricultural implement, the combination with a tractor, of a shaft supported by the front axle of the tractor and by the body of the tractor, and located at one side of the body of the tractor, said shaft having a diagonal intermediate portion, a beam in the form of a bail loosely mounted on the diagonal portion of said shaft, and earth-working devices attached to the arms of said beam.

3. In an agricultural implement, the combination with a tractor body and a front axle therefor pivoted about a longitudinal axis, of a shaft located at one side of the tractor body, and having an effective draft connection with one side of the tractor body forwardly of the rear end thereof and with the front axle, said shaft having a diagonal intermediate portion, a beam loosely connected with the diagonal portion of said shaft, and earth-working means carried by said beam.

4. In an agricultural implement, the combination with a tractor body and a front axle, of a forward bracket secured to and projecting rearwardly from the front axle, a rear bracket secured to the side of the tractor body, a shaft supported at one end of said forward bracket and attached at its rear end to the rear bracket at the side of the tractor body, said shaft having a diagonal intermediate portion, a beam loosely mounted on the diagonal portion of said shaft, and earth working means carried by said beam.

5. In an agricultural implement, the combination with a tractor body and a front axle, of a shaft located at one side of the tractor body and supported by the latter and the front axle, said shaft having a diagonal intermediate portion, said shaft having an effective draft connection at its rear end with one side of the tractor body forwardly of the rear end thereof, a beam loosely mounted on the diagonal intermediate portion of said shaft, earth-working means carried by said beam, a hand lever, connections between said lever and the loosely mounted beam, and means for locking said lever.

6. In an agricultural implement, the combination with a tractor body and a front axle, of a non-rotatable side shaft having a diagonal intermediate portion, a forward bracket secured to the front axle for supporting the forward end of said shaft, a rear bracket secured to the side of the tractor body and having said shaft attached thereto, said rear bracket constituting an effective draft connection for the rear end of said shaft with the tractor body forwardly of the rear end thereof, a beam loosely mounted on the diagonal portion of said side shaft, earth-working means carried by said beam, a toothed segment frame secured to the rear bracket and to a part on the tractor body, a pivoted hand lever having an arm at its lower end, connecting means between lever arm and said beam, and a detent carried by the hand lever to engage the toothed portion of the segment frame.

7. In an agricultural implement, the combination of a non-rotatable shaft having an intermediate diagonal portion, and end portions disposed in parallel planes, means for mounting said shaft at one side of a tractor body, a beam having a plurality of lever arms, arms secured to said beam and loosely mounted on the diagonal intermediate portion of said non-rotatable shaft, and earth-working devices carried by the arms of said beam.

8. An agricultural implement adapted for attachment at one side of a tractor, comprising a shaft, means for providing an effective draft connection for the rear end of said shaft with one side of a tractor forwardly of its rear end, means for supporting the forward end of said shaft, tool-carrying means mounted on said shaft to turn, and one or more tools connected with said tool-carrying means.

9. An agricultural implement adapted for attachment to one side of a tractor, comprising a supporting member having end portions in parallel planes and an intermediate portion disposed diagonally with relation to the end portions, tool-carrying means loosely mounted on the diagonal portion of said supporting member, tools attached to said tool carrying means, and means for rocking said tool-carrying means to raise and lower the tools.

10. The combination with a tractor, of a shaft at one side of the tractor in forwardly extending diagonal relation thereto, means for supporting the forward end of said shaft, means providing an effective draft connection for said shaft with the side of the tractor forwardly of the rear end thereof, soil engaging means, and means connecting said soil engaging means with said shaft between the ends of the shaft.

In testimony whereof I have signed this specification.

RUDOLPH J. ALTGELT.